United States Patent [19]

Millauer et al.

[11] Patent Number: 4,681,489
[45] Date of Patent: Jul. 21, 1987

[54] PROCESS OF FORMING OPENINGS

[75] Inventors: Wolfgang Millauer; Dieter Raab, both of Munich, Fed. Rep. of Germany

[73] Assignee: Hilti Aktiengesellschaft, Fürstentum, Liechtenstein

[21] Appl. No.: 802,757

[22] Filed: Nov. 27, 1985

[30] Foreign Application Priority Data

Nov. 29, 1984 [DE] Fed. Rep. of Germany ....... 3443591

[51] Int. Cl.$^4$ .............................................. H02G 1/12
[52] U.S. Cl. ...................................... 408/1 R; 408/12; 408/710; 29/407; 204/1 T; 204/400
[58] Field of Search ............... 125/1; 29/407, 593; 408/6, 7, 9, 11, 12, 1, 710; 175/50; 204/400, 1 T

[56] References Cited

U.S. PATENT DOCUMENTS 2,747,154 5/1956 Abrams .................................. 408/7
4,255,241 3/1981 Kroon et al. ....................... 204/196

FOREIGN PATENT DOCUMENTS 3206354 9/1953 Fed. Rep. of Germany ........ 408/12
686826 9/1979 U.S.S.R. ............................... 408/12

Primary Examiner—Harold D. Whitehead
Attorney, Agent, or Firm—Toren, McGeady & Associates

[57] ABSTRACT

For locating steel reinforcing members in construction materials, a galvanic cell is formed between an electrode and the reinforcing members by placing the electrode in electrically conducting contact with the construction material. When drilling an opening into the construction material using a hand-held drilling device and the drilling bit in the device contacts a reinforcing member, the potential difference between the electrode and the drill bit can be utilized as a signal for controlling the operation of the drilling device.

7 Claims, 1 Drawing Figure

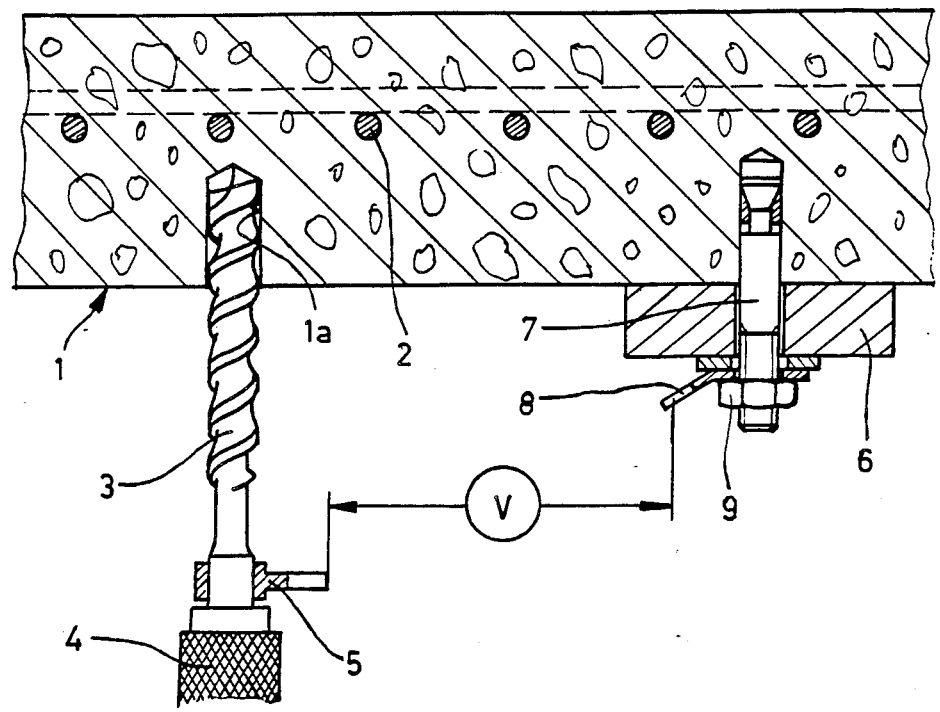

PROCESS OF FORMING OPENINGS

BACKGROUND OF THE INVENTION

The present invention is directed to a process of producing or cutting openings in a cement bonded construction material including steel reinforcing members, such as concrete or the like, by utilizing drill or chisel bits in a hand-held drilling device.

For forming openings, such as bores, grooves or the like, at the present time, in addition to so-called wall milling, principally drilling or chipping hammers are used. The operation of such devices is based mostly on an electropneumatic system and when compared to impact drilling devices, they show a considerably higher material removal performance.

In the formation of such openings there has been a problem when the bit in the drilling device contacts a steel reinforcing member or rod which, for the most part, is not detectable from the exterior of a structure. The drill bit is very quickly damaged when it contacts a steel reinforcing member due to the impact energy and the bit can be rendered unusable in a short time period.

Detectors are known for locating reinforcing members in construction materials. Such devices, however, are very inaccurate and in practice are usable only for locating reinforcing members positioned directly below the surface. Moreover, such devices are very delicate and from a practical point of view are unsuitable for the rough handling experienced on a construction site.

Furthermore, there are expensive procedures for carrying out the locating operation, such as X-ray technology, ultra-sonic processes or the like, however, for both practical and economic reasons they are not used.

SUMMARY OF THE INVENTION

Therefore, the primary object of the present invention is to provide a process of forming openings in construction material incorporating steel reinforcing members in which damage to or destruction of drill bits is avoided.

In accordance with the present invention, the process is carried out by establishing electrically conducting contacts between a non-ferrous metal electrode and the construction material, by measuring the voltage generated in forming a galvanic cell between the electrode and the drilling device, and utilizing the potential difference occurring when the drill bit contacts a steel reinforcing member as a signal for controlling the operation of the drilling device.

As distinguished from known methods, the reinforcing members are not located before commencing the drilling operation, rather the reinforcing members are located by the actual contact of the drilling bit with one of the reinforcing members. Using this process a considerable saving in time is effected as compared to the relatively inaccurate location of the reinforcing members used in the past.

The process according to the present invention is based on the principle that two metals with different electric potentials in connection with one another through an electrolyte, form a galvanic cell and produce a voltage corresponding to the difference in potential of the metals utilized. The construction material acts as the electrolyte. Since steel reinforcing members are, for the most part, located within the interior of the construction material, such a voltage cannot be established from the exterior of the material. When the bit in a drilling device contacts one of the reinforcing members the device, if viewed electrically, acts as a measuring probe determining the potential of the steel reinforcing members as compared to the non-ferrous metal electrode applied to the construction material.

Since the galvanic cell formed by the electrode and the reinforcing member produces a relatively low voltage, no outside energy is required for the process if viewed purely from the measurement technology point of view.

It is possible that the signal generated when the drilling bit contacts the reinforcing member, with appropriate amplification, actuates a switching process for disconnecting the tool from the power supply or for actuating the clutch or brake. It is also possible, to check the signal optically with appropriate lamps or light-emitting diodes or even acoustically. With such a signalling arrangement, the operator would be required to take the appropriate measures.

As mentioned above, the difference in potential between the material of the electrodes and the reinforcing members determines the magnitude of the voltage. For establishing certain minimum requirements for the material of the electrode for reasons of strength and chemical durability, it is appropriate if the electrode is formed of aluminum. The difference in potential between steel and aluminum amounts approximately to 1.2 volts. Such a difference in voltage can be measured by less sensitive instruments and can be utilized directly for controlling the drilling device.

In another advantageous embodiment, the electrode is formed of zinc. In such an arrangement the difference in potential with respect to iron or steel incorporated into the concrete, with concrete as an electrolyte, amounts to approximately one volt. It is also possible to use other metals. In the process of the present invention the drilling bit constitutes the measuring probe. Since the drilling bit contacts the construction material during the drilling process, it is possible that a galvanic cell is formed between the drilling bit and the electrode, and when the drilling bit contacts the reinforcing member no substantial voltage change occurs. To avoid such a situation, it is appropriate to coat the drilling bit. The coating material may be an insulating material such as plastics or the like. It is also possible to coat the drilling bit with the same material as used for the electrode. If the electrode is formed of zinc, a zinc layer can be deposited on the drilling bit in a galvanic process or by a so-called hot-dip galvanization operation. If an aluminum electrode is used, an aluminum coating can be deposited on the drilling bit by a plasma spray process.

Instead of coating the drilling bit, it can be formed from a non-ferrous material. From a practical point of view, however, certain limits are imposed, since the conventional hard metal inserts at the cutting edges of the drilling bit can not be secured with the shaft of the bit in a soldering operation.

In practice it has been established that a steel drilling bit rotating in concrete assumes, through such motion, the voltage of half a cell and approaches that of a stationary aluminum or zinc member. Accordingly, during the drilling operation the voltage difference between a steel drill bit and the electrode is considerably less than that between the steel reinforcing members and the electrode. The formation of the drilling bit from a non-ferrous material or the coating of the bit from such a material while useful for the operation of the process, is not absolutely required.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The drawing is a schematic showing of the invention.

DETAILED DESCRIPTION OF THE INVENTION

In the drawing, a construction material 1 such, as concrete, includes steel reinforcing members 2 interconnected electrically with one another. A drill bit 3 is shown forming an opening or borehole 1a in the construction material 1. Drill bit 3 is positioned within a chuck 4 of a drilling device, not shown in detail. A slip ring 5 is in electrical contact with the drill bit 3 and is secured on the bit adjacent the chuck 4. An electrode 6 is secured to the surface of the construction material 1 spaced from the drill bit with a dowel 7 extending into the construction material for securing the electrode. Electrode 6 along with a clip 8 is held against the construction material 1 by a nut 9.

Electrode 6 is formed of a non-ferrous material, such as aluminum. Accordingly, a potential difference exists between the electrode 6 and the reinforcing members 2 within the construction material 1. The combination of the electrode 6 and the reinforcing members 2 form, with the construction material 1, a galvanic cell. A voltage exists between the electrode 6 and the reinforcing members 2, and if aluminum is used for the electrode 6 the voltage amounts to about 1.2 volts. Drill bit 3 serves in the galvanic cell as a measuring probe. During the drilling operation, if the drill bit 3 contacts a steel reinforcing member 2, then the voltage between the electrode 6 and the reinforcing member or between the slip ring 5 in electrical connection with the drill bit 3 and the clip 8, can be tapped, measured and the change in voltage generated by the contact of the drill bit 3 with the reinforcing member 2 can be used as a signal for controlling the operation of the drilling device. To prevent the establishment of a galvanic cell between the drill bit 3 and the electrode 6, the surface of the drill bit can be coated with an insulated material or with the same material as that of the electrode 6.

While specific embodiments of the invention have been shown and described in detail to illustrate the application of the inventive principles, it will be understood that the invention may be embodied otherwise without departing from such principles.

We claim:

1. Process of forming openings in reinforced concrete incorporating steel reinforcing members, employing a drilling or chipping bit inserted into a hand-held drilling device for forming the opening, wherein the improvement comprises the steps of placing a non-ferrous metallic electrode into electrically conducting contact with the surface of the reinforced concrete in spaced relation from the reinforcing members, placing the electrode in electrical contact with the drilling or chipping bit, measuring the voltage developed between the electrode and the drilling or chipping bit due to the formation of a galvanic cell using the reinforced concrete as an electrolyte, and while drilling into the reinforced concrete with the drilling device utilizing the voltage change occurring upon contact of the drilling or chipping bit with a steel reinforcing member in the reinforced concrete for controlling the operation of the drilling device.

2. Process, as set forth in claim 1, wherein the electrode is formed of aluminum.

3. Process, as set forth in claim 1, wherein the electrode is formed of zinc.

4. Process, a set forth in claim 1, wherein the drilling bit is coated with an insulating material.

5. Process, as set forth in claim 1, wherein the drilling bit is coated with the same material as forms the electrode.

6. Process, as set forth in claim 1, wherein the drilling bit is formed of a non-ferrous metal.

7. Process, as set forth in claim 1, including the step of forming the galvanic cell free of any outside energy.

* * * * *